(12) United States Patent
Chuang et al.

(10) Patent No.: US 11,327,598 B1
(45) Date of Patent: May 10, 2022

(54) TOUCH DETECTION CIRCUIT CHIP WITH REDUCED POWER CONSUMPTION

(71) Applicant: Audiowise Technology Inc., Hsinchu (TW)

(72) Inventors: Chia-So Chuang, Hsinchu (TW); Pin-Hsuan Huang, Hsinchu (TW); Tsung-Han Yang, Hsinchu (TW)

(73) Assignee: Audiowise Technology Inc., Hsinchu (TW)

( * ) Notice: Subject to any disclaimer, the term of this patent is extended or adjusted under 35 U.S.C. 154(b) by 0 days.

(21) Appl. No.: 17/075,668

(22) Filed: Oct. 20, 2020

(51) Int. Cl.
*G06F 3/041* (2006.01)
*G06F 1/06* (2006.01)
*G06F 1/3234* (2019.01)
*G06F 1/3231* (2019.01)

(52) U.S. Cl.
CPC .............. *G06F 3/0416* (2013.01); *G06F 1/06* (2013.01); *G06F 1/3231* (2013.01); *G06F 1/3262* (2013.01)

(58) Field of Classification Search
CPC ................ G06F 3/0416; G06F 1/3262; G09G 2330/021
See application file for complete search history.

(56) References Cited

U.S. PATENT DOCUMENTS

2019/0114020 A1* 4/2019 Ding .................. G06F 3/042
2019/0204968 A1* 7/2019 Hur ................... G06F 3/04184

* cited by examiner

*Primary Examiner* — Laurence J Lee
(74) *Attorney, Agent, or Firm* — Winston Hsu

(57) ABSTRACT

A control chip comprising: at least pin; a control circuit; a clock generation circuit, configured to generate a clock signal; a power providing circuit, configured to provide an always on power; a touch detection circuit, configured to receive the always on power, and configured to detect a touch event via the pin to generate a touch detection signal; a logic circuit, configured to receive the always on power, the clock signal and the touch detection signal, wherein the logic circuit controls the power providing circuit to provide a core power to the control circuit according to the touch detection signal. The control circuit is further configured to set the logic circuit such that the logic circuit can control the touch detection circuit. A related touch detection method is also discloses. Via the control chip and the touch detection method, the circuit area and the power consumption can be decreased.

16 Claims, 7 Drawing Sheets

TOUCH DETECTION CIRCUIT CHIP WITH REDUCED POWER CONSUMPTION

BACKGROUND OF THE INVENTION

1. Field of the Invention

The present invention relates to a control chip and a touch detection method, and particularly relates to a control chip and a touch detection method which can integrate a touch detection circuit to a chip to save the circuit area and reduce power consumption.

2. Description of the Prior Art

A touch control function becomes more and more popular in recent years. However, an additional touch detection IC (integrated circuit) is always needed, thus needs more circuit area. Further, a device which has a touch detection function may cause more power consumption. Besides, a control circuit, such as a MCU (Micro Control Unit), may have larger leakage currents. Therefore, the longer the control circuit is turned on, the higher the power consumption is.

Therefore, a control chip and a touch detection method which can decrease required circuit area and reduce power consumption are needed.

SUMMARY OF THE INVENTION

One objective of the present invention is to provide a control chip which can save circuit area and reduce power consumption.

Another objective of the present invention is to provide a touch detection method which can save circuit area and reduce power consumption.

One embodiment of the present invention discloses a control chip comprising: at least one pin; a control circuit; a clock generation circuit, configured to generate a clock signal; a power providing circuit, configured to provide an always on power; a touch detection circuit, configured to receive the always on power, and configured to detect a touch event via the pin to generate a touch detection signal; a logic circuit, configured to receive the always on power, the clock signal and the touch detection signal, wherein the logic circuit controls the power providing circuit to provide a core power to the control circuit according to the touch detection signal. The control circuit is further configured to set the logic circuit such that the logic circuit can control the touch detection circuit.

Another embodiment of the present invention discloses a touch detection method, applied to a control chip comprising a control circuit, a clock generation circuit, a touch detection circuit, and a logic circuit, comprising: providing an always on power to the clock generation circuit, the touch detection circuit, and the logic circuit; generating a clock signal to the logic circuit by the clock generation circuit; detecting a touch event to generate a touch detection signal by the touch detection circuit; controlling the power providing circuit to provide a core power to the control circuit according to the touch detection signal by the logic circuit; and setting the logic circuit by the control circuit such that the logic circuit can control the touch detection circuit.

In view of above-mentioned embodiments, the circuit area can be reduced since the touch control circuit is integrated to the control chip, and the power consumption can be reduced since the core power and/or the always on power can have a lower voltage level before the touch event occurs.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices. Furthermore, the term "when" can mean the time that something occurs or the time after the time that something occurs. For example, the X signal transits from high to low when the setting is completed can mean X signal transits at the time that the setting is completed or after the time that the set is completed.

Figure 1:
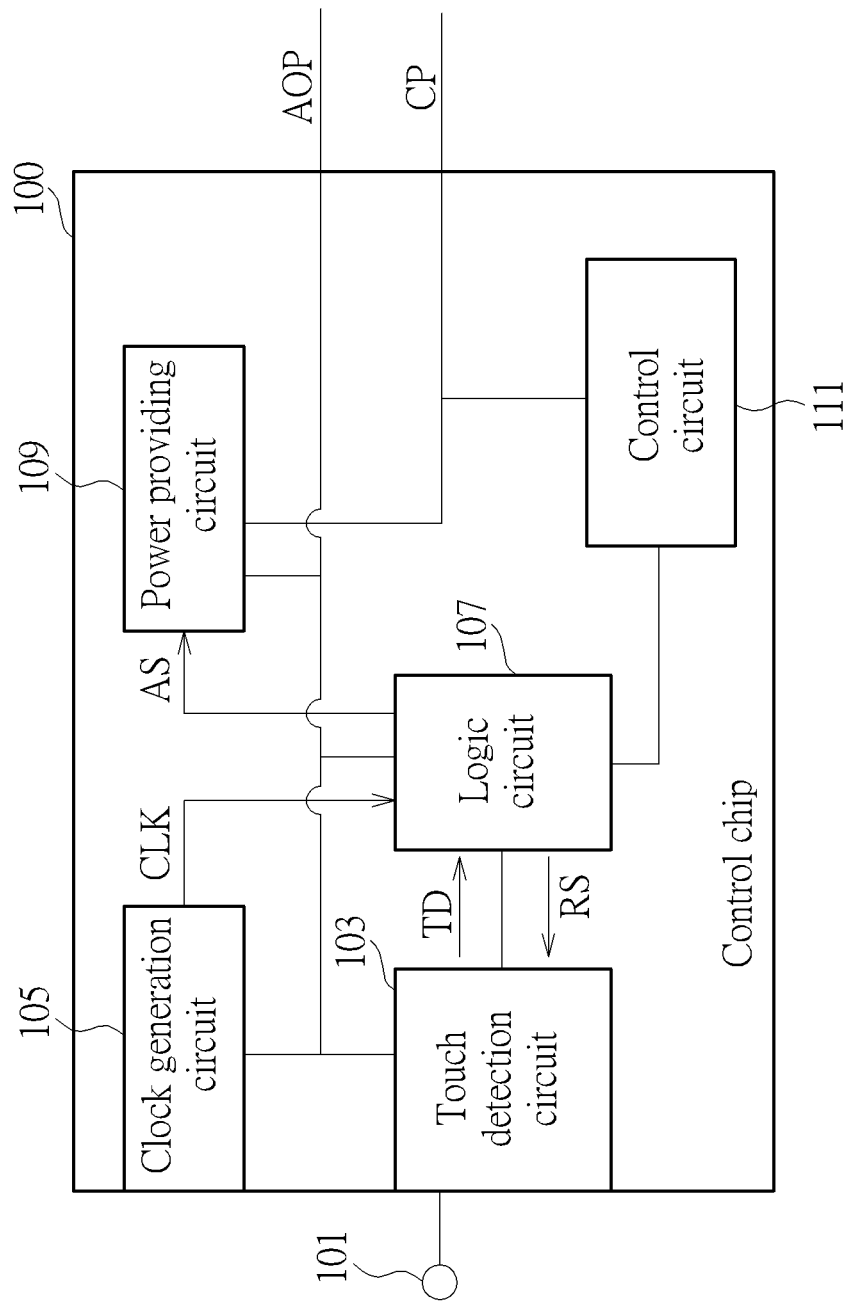
FIG. 1 is a block diagram illustrating a control chip according to one embodiment of the present invention.

FIG. 1 is a block diagram illustrating a control chip 100 according to one embodiment of the present invention. The control chip 100 can also be named as a touch detection chip or a power control chip, since the control chip 100 has the function of touch detection and power control.

As illustrated in FIG. 1, the control chip 100 comprises at least one pin 101 (only one of the pins is marked), a touch detection circuit 103, a clock generation circuit 105, a logic circuit 107, a power providing circuit 109, and a control circuit 111. The touch detection circuit 103 is configured to receive an always on power AOP, and configured to detect a touch event via the pin 101 to generate a touch detection signal TD. In one embodiment, the pin 101 is coupled to a touch screen. The touch value of the touch screen varies if an object touches it. Therefore, the touch detection circuit 103 can detect a touch event according to the touch values. The touch screen can be but is not limited to an optical touch screen or a capacitive touch screen, thus the touch values can be optical data such as brightness or capacitive values.

The clock generation circuit 105 is configured to generate a clock signal CLK. The logic circuit 107 is configured to receive the always on power AOP, the clock signal CLK and the touch detection signal TD. The power providing circuit 109 is configured to provide the always on power AOP and/or a core power CP. The logic circuit 107 controls the power providing circuit 109 to provide the core power CP to the control circuit 111 according to the touch detection signal TD. In the present invention, the turning on time of the control circuit 111 can be decreased via controlling the power providing circuit 109 to provide the core power CP or not. By this way, the power consumption caused by the control circuit 111 can be reduced. Besides, the control circuit 111 is further configured to set the logic circuit 107 such that the logic circuit can control the touch detection circuit 101. The control circuit 111 can be any circuit which can perform the function stated in the present invention. The control circuit 111 can be, for example, a CPU (Central Processing Unit), a processor, or a MCU.

The always on power AOP can be set to any required voltage level. For example, for the requirement of touch detection, the always on power AOP can be set to be higher than the core power CP. Also, in one embodiment, the always on power is an I/O power which can be used by the control chip 100 to communicate with other outer components coupled to the control chip 100. Additionally, in one embodiment, the core power CP is a power which can be applied to other components that are inside a device in which the control chip 100 is provided as an operation power. The core power CP can also be set to any required voltage level. In one embodiment, the voltage level of the core power CP is lower than the voltage level of the always on power AOP, which is applied to the detection circuit 103. For example, the core power CO is 1.1v, and the always on power AOP is 1.8v or 3.3v.

Figure 2:
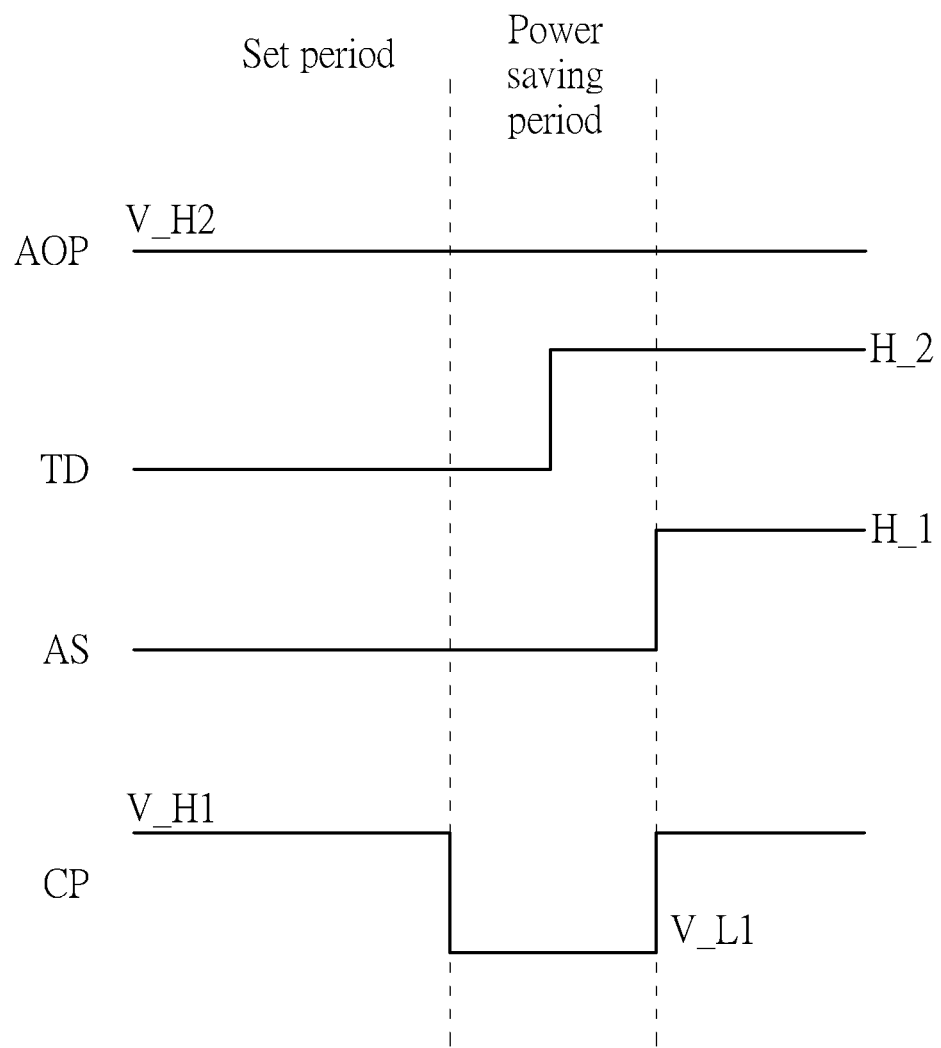
FIG. 2 and FIG. 3 are timing diagrams illustrating operations of the control chip in FIG. 1 according to one embodiment of the present invention.

FIG. 2 is a timing diagram illustrating operations of the control chip 100 in FIG. 1 according to one embodiment of the present invention. In the embodiment of FIG. 2, the core power CP initially has a first high voltage level V_H1 and the always on power AOP initially has a second high voltage level V_H2. For example, when the device in which the control chip 100 is provided is turned on, the core power CP has the first high voltage level V_H1 and the always on power AOP has the second high voltage level V_H2. For the convenience of explaining, the time period in which the core power CP has the first high voltage level V_H1 and the always on power AOP has the second high voltage level V_H2 is named as "set period" in following descriptions.

In the set period, the control circuit 111 sets the logic circuit 107 such that the logic circuit 107 can control the power providing circuit 109 to provide the core power CP according to the touch detection signal TD. For example, the control circuit 111 can set the parameters of the components in the logic circuit 107 or provide a suitable operating voltage to the logic circuit 107 in the set period.

In the embodiment of FIG. 2, the core power CP transits from the first high voltage level V_H1 to a first low voltage level V_L1, when the control circuit 111 completes the setting of the logic circuit 107. Please note, the first low voltage level V_L1 can represent that the power providing circuit 109 does not output the core power CP (i.e., the core power CP is 0), rather than limited to a specific low voltage level. The time period in which the core power CP has the first low voltage level V_L1 is named as a power saving period in following descriptions, for the convenience of explaining. In one embodiment, the control circuit 111 operates in a sleep mode in the power saving period and operates in an active mode when the core power CP has the first high voltage level V_H1 (i.e., not in the power saving period). The sleep mode mentioned here can mean the control circuit 111 is turned off or only some functions thereof are available.

Also, during the power saving period, the logic circuit 107 generates an activation signal AS with a high logic level H_1 to trigger the power providing circuit 109 to provide the core power CP with the first high voltage level V_H1 when the touch detection signal TD means the touch event occurs, such that the control circuit 111 can switch from the sleep mode to an active mode. In the embodiment of FIG. 2, the touch detection signal TD means the touch event occurs if it has a high logic level H_2 and means the touch event does not occur if it has a low logic level L_2. The touch event occurs can mean, for example, an object such as a finger touches a touch screen coupled to the touch detection circuit 103.

Figure 3:
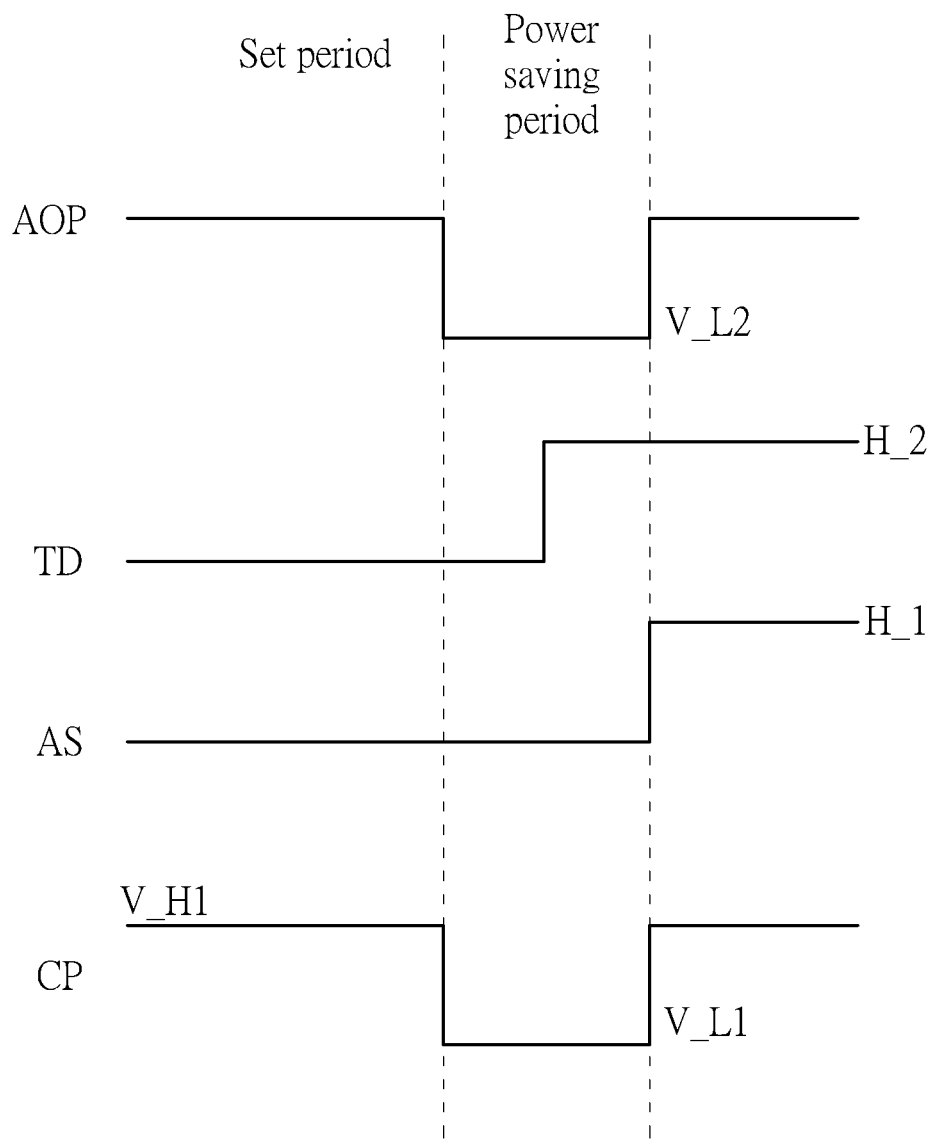

In one embodiment, the always on power AOP has a second low voltage level V_L2 during the power saving period rather than keeps at the second high voltage level V_H2, as shown in the embodiment of FIG. 3. Similarly, the second low voltage level V_L2 can represent that the power providing circuit 109 does not output the always on power AOP (i.e., the always on power AOP is 0), rather than limited to a specific low voltage level. In such case, the always on power AOP can be regarded as an auxiliary voltage which has a second low voltage level V_L2 during the power saving period and has a second high voltage level V_H2 if not in the power saving period. Following the same rule, the always on power AOP in the embodiment of FIG. 2 can be regarded as an auxiliary voltage which has a second high voltage level V_H2 regardless of whether it is in the power saving period or not.

In other words, in the embodiment of FIG. 3, the always on power AOP transits from a second high voltage level V_H2 to a second low voltage level V_L2, when the control circuit 111 sets the logic circuit 107 such that the logic circuit 107 can control the power providing circuit 109 to provide the core power CP according to the touch detection signal TD (i.e., the setting of the logic circuit 107 is completed). Also, in the embodiment of FIG. 3, the always on power AOP transits from the second low voltage level V_L2 to the second high voltage level V_H2, and the core power CP transits from the first low voltage level V_L1 to the first high voltage level V_H1, when the touch detection signal TD means the touch event occurs. In other words, the always on power AOP can be regarded as transiting from the second low voltage level V_L2 to the second high voltage level V_H2, when the control circuit 111 switches from the sleep mode to the active mode.

Figure 4:
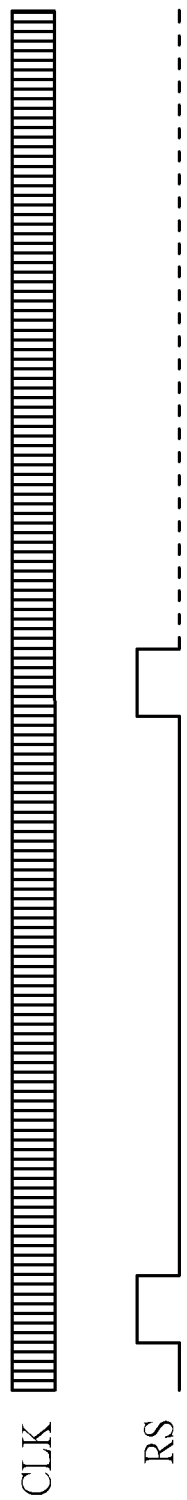
FIG. 4 is a timing diagram of the operations of the logic circuit in FIG. 1.

In the embodiments of FIG. 3 and FIG. 4, the control circuit 111 can operate in the sleep mode during the power saving period. As above-mentioned, the control circuit 111 may have larger leakage currents when it is turned on. Accordingly, the total power consumption of the control circuit 111 can be reduced since the control circuit 111 can operate in the sleep mode until the touch event occurs.

In one embodiment, the logic circuit 107 can further generate a reference signal RS to trigger the touch detection circuit 103, as shown in FIG. 1. FIG. 4 is a timing diagram of the operation of the logic circuit. As shown in FIG. 1 and FIG. 4, the logic circuit 107 receives the clock signal CLK from the clock generation circuit 105 and generates a reference signal RS according to the clock signal CLK.

Specifically, the logic circuit 107 counts the clock signal CLK, which means a number that a specific logic value of the clock signal CLK occurs, and generates a reference signal RS with a high logic value every time the count value reaches a predetermined value, and then resets the count value. The logic circuit 107 also generates a reference signal RS with a low logic value when the count value is below the predetermined value.

Figure 5:
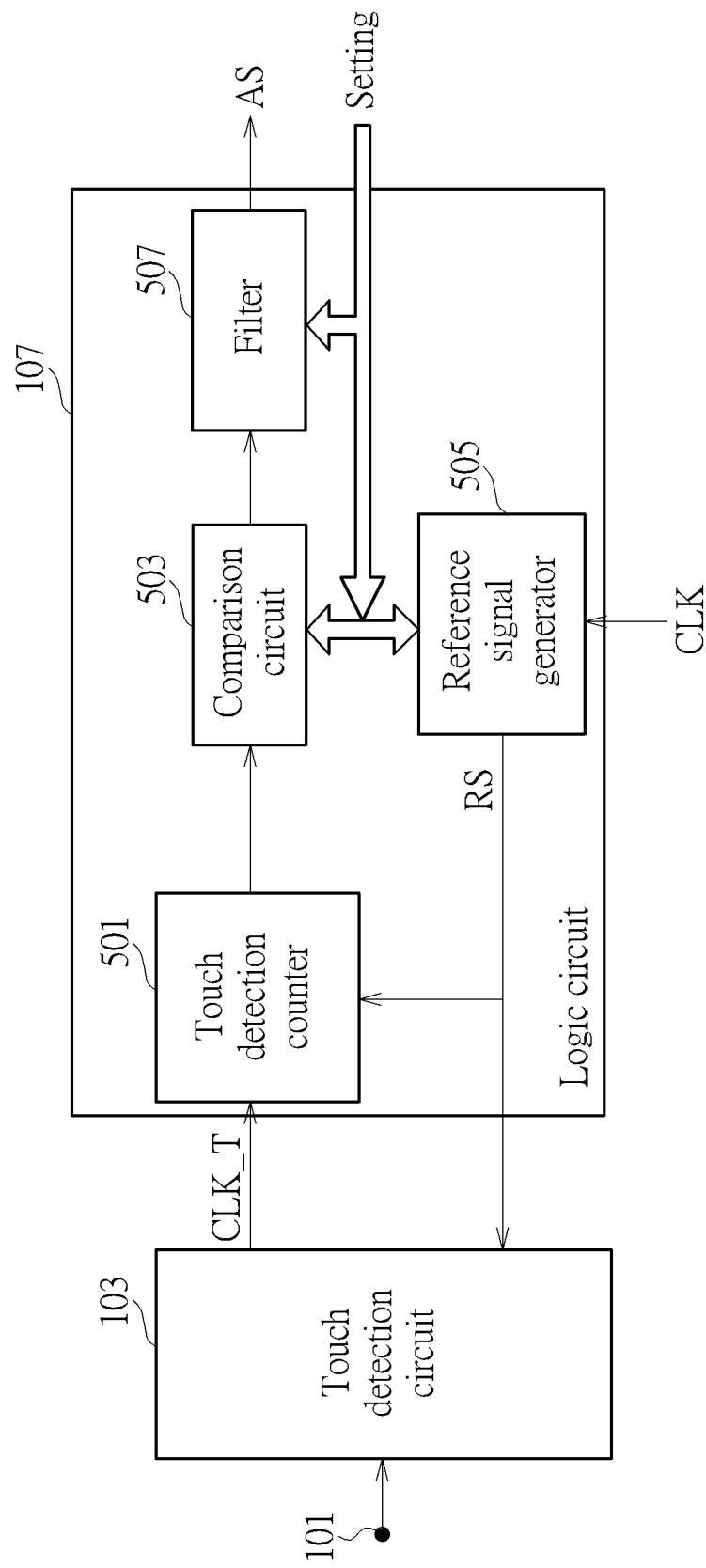
FIG. 5 is a block diagram illustrating details of the logic circuit in FIG. 1 of the present invention, according to one embodiment of the present invention.
Figure 6:
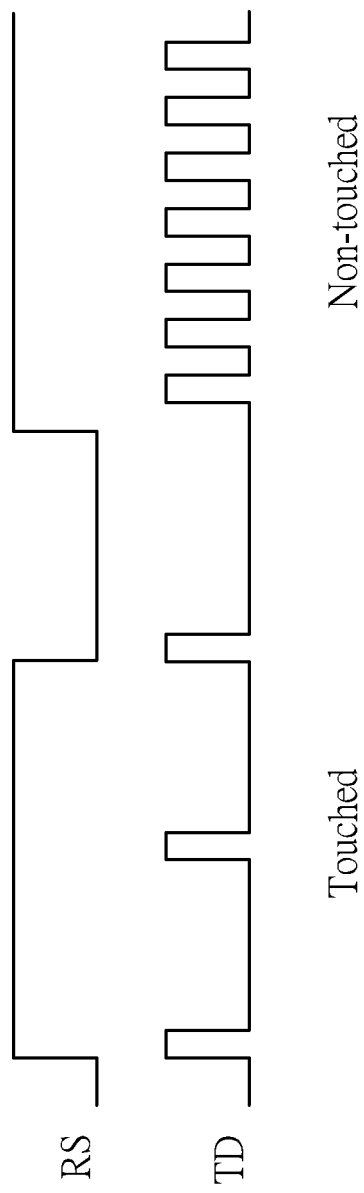
FIG. 6 is a timing diagram illustrating the reference signal and the touch detection signal in FIG. 5, according to one embodiment of the present invention.

FIG. 5 is a block diagram illustrating details of the logic circuit in FIG. 1 of the present invention, according to one embodiment of the present invention. FIG. 6 is a timing diagram illustrating the reference signal RS and the touch detection clock signal CLK T in FIG. 5. Please also refer to FIG. 5 while referring to FIG. 6, to understand the concept of the present invention for more clarity.

As shown in FIG. 5, the logic circuit 107 comprises a touch detection counter 501, a comparison circuit 503, a reference signal generator 505, and a filter 507. As above-mentioned, during the set period, the control circuit 111 can set the logic circuit 107. Such setting can mean set the parameter of at least one of the comparison circuit 503, the reference signal generator 505, and the filter 507. Also, in the embodiment of FIG. 5, the touch detection signal TD in FIG. 1 is a touch detection clock signal CLK T. The frequency of the touch detection clock signal CLK T corresponding to that the touch event does not occur and a frequency of the touch detection clock signal CLK T corresponding to that the touch event occurs are different. In one embodiment, the touch detection clock signal CLK T has a higher frequency if the touch event does not occur and has a lower frequency if the touch event occurs, as shown in FIG. 6.

The touch detection counter 501 is configured to count the touch detection clock signal CLK T in each period that the reference signal RS has the high logic level H_1, as illustrated in FIG. 6. Therefore, the count value output by the touch detection counter 501 is larger than a touch threshold if the touch event does not occur but is smaller than the touch threshold if the touch event does occur. The comparison circuit 503 compares the count value with the touch threshold, thus generates an active signal AS with a low logic value if the touch event does not occur and generates an active signal AS with a high logic value if the touch event occurs. It will be appreciated that the touch detection signal TD is not limited to a signal has different frequencies corresponding to the touch event. Therefore, the touch threshold can correspond to the touch detection signal TD to have different kinds of values.

In one embodiment, the touch threshold can be dynamically adjusted by the control circuit 111 according to an environment parameter. The environment parameter can be, for example, a temperature, humidity, or a pressure. In such case, an environment detector coupled to the control circuit 111 can be further provided, to acquire the environment parameter and transmits it to the control circuit 111.

Figure 7:
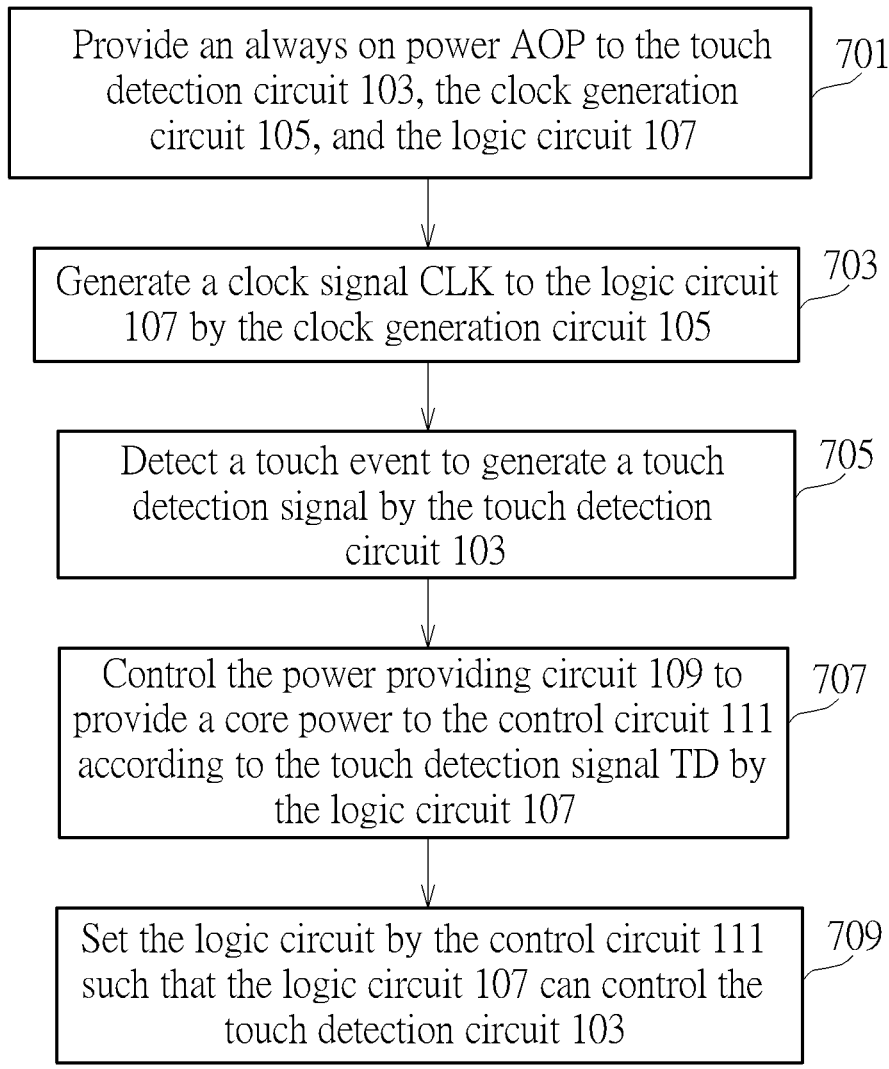
FIG. 7 is a flow chart illustrating a touch detection method, according to one embodiment of the present invention.

In view of above-mentioned embodiments, a touch detection method as shown in FIG. 7 can be acquired, which can be performed by but not limited to the control chip illustrated in FIG. 1. Please note a sequence of the touch detection method provided by the present invention is not limited to a sequence of the steps in FIG. 7. The touch detection method in FIG. 7 comprises:

Step 701

Provide an always on power AOP to the touch detection circuit 103, the clock generation circuit 105, and the logic circuit 107.

Step 703

Generate a clock signal CLK to the logic circuit 107 by the clock generation circuit 105.

Step 705

Detect a touch event to generate a touch detection signal by the touch detection circuit 103.

Step 707

Control the power providing circuit 109 to provide a core power to the control circuit 111 according to the touch detection signal TD by the logic circuit 107.

Step 709

Set the logic circuit by the control circuit 111 such that the logic circuit 107 can control the touch detection circuit 103.

The above-mentioned embodiments can be applied to an electronic device with a small size, such as a wearable device. In such case, the advantage of a smaller circuit area and a low power consumption of the present invention can be more apparent.

In view of above-mentioned embodiments, the circuit area can be reduced since the touch control circuit is integrated to the control chip, and the power consumption can be reduced since the core power and/or the always on power can have a lower voltage level before the touch event occurs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control chip, comprising:
at least one pin;
a control circuit;
a clock generation circuit, configured to generate a clock signal;
a power providing circuit, configured to provide an always on power;
a touch detection circuit, configured to receive the always on power, and configured to detect a touch event via the at least one pin to generate a touch detection signal;
a logic circuit, configured to receive the always on power, the clock signal and the touch detection signal, wherein the logic circuit controls the power providing circuit to provide a core power to the control circuit according to the touch detection signal;
wherein the control circuit is further configured to set the logic circuit such that the logic circuit can control the touch detection circuit.

2. The control chip of claim 1, wherein the core power transits from a first high voltage level to a first low voltage level, when the control circuit sets the logic circuit such that the logic circuit can control the power providing circuit to provide the core power to the control circuit according to the touch detection signal.

3. The control chip of claim 2, wherein the always on power transits from a second high voltage level to a second low voltage level, when the control circuit sets the logic circuit such that the logic circuit can control the power providing circuit to provide the core power to the control circuit according to the touch detection signal.

4. The control chip of claim 3, wherein the always on power transits from the second low voltage level to the second high voltage level, and the core power transits from the first low voltage level to the first high voltage level, if the touch detection signal means the touch event occurs.

5. The control chip of claim 3, wherein the control circuit operates in a sleep mode when the core power has the first low voltage level.

6. The control chip of claim 5, wherein the logic circuit generates an activation signal to trigger the control circuit to switch from the sleep mode to an active mode when the touch detection signal means the touch event occurs;
wherein the always on power transits from the second low voltage level to the second high voltage level, when the control circuit switches from the sleep mode to the active mode.

7. The control chip of claim 1, wherein a frequency of the touch detection signal differs depending upon whether or not a touch event is detected.

8. The control chip of claim 1, wherein the logic circuit controls the power providing circuit to provide the core power to the control circuit according to a relation between the touch detection signal and a touch threshold, wherein the control circuit dynamically adjusts the touch threshold according to an environment parameter.

9. A touch detection method, applied to a control chip comprising a control circuit, a clock generation circuit, a touch detection circuit, and a logic circuit, comprising:
providing an always on power to the clock generation circuit, the touch detection circuit, and the logic circuit;
generating a clock signal to the logic circuit by the clock generation circuit;
detecting a touch event to generate a touch detection signal by the touch detection circuit;
controlling the power providing circuit to provide a core power to the control circuit according to the touch detection signal by the logic circuit; and
setting the logic circuit by the control circuit such that the logic circuit can control the touch detection circuit.

10. The touch detection method of claim 9, further comprising:
transiting the core power from a first high voltage level to a first low voltage level, when the control circuit sets the logic circuit such that the logic circuit can control the power providing circuit to provide the core power to the control circuit according to the touch detection signal.

11. The touch detection method of claim 10, further comprising:
transiting the always on power transits from a second high voltage level to a second low voltage level, when the control circuit sets the logic circuit such that the logic circuit can control the power providing circuit to provide the core power to the control circuit according to the touch detection signal.

12. The touch detection method of claim 11, further comprising:
transiting the always on power from the second low voltage level to the second high voltage level, and transiting the core power from the first low voltage level to the first high voltage level, if the touch detection signal means the touch event occurs.

13. The touch detection method of claim 11, wherein the control circuit operates in a sleep mode when the core power has the first low voltage level.

14. The touch detection method of claim 13, further comprising:
generating an activation signal by the logic circuit to trigger the control circuit to switch from the sleep mode to an active mode when the touch detection signal means the touch event occurs;
controlling the always on power to transit from the second low voltage level to the second high voltage level, when the control circuit switches from the sleep mode to the active mode.

15. The touch detection method of claim 9, wherein a frequency of the touch detection signal differs depending upon whether or not a touch event is detected.

16. The touch detection method of claim 9, further comprising:
controlling the power providing circuit to provide the core power to the control circuit by the logic circuit according to a relation between the touch detection signal and a touch threshold; and
dynamically adjusting the touch threshold according to an environment parameter by the control circuit.

* * * * *